United States Patent [19]

Morimoto

[11] Patent Number: 5,749,534
[45] Date of Patent: May 12, 1998

[54] BRAKE MECHANISM FOR DOUBLE-BEARING FISHING REEL

[75] Inventor: Shinichi Morimoto, Nishinomiya, Japan

[73] Assignee: Shimano Inc., Osaka, Japan

[21] Appl. No.: 853,017

[22] Filed: May 8, 1997

[30] Foreign Application Priority Data

May 16, 1996 [JP] Japan .................. 8-121879

[51] Int. Cl.⁶ .................. A01K 89/033; A01K 89/0155
[52] U.S. Cl. .................. 242/288; 188/164; 188/267
[58] Field of Search .................. 242/248; 188/267, 188/164

[56] References Cited

U.S. PATENT DOCUMENTS

| | | | |
|---|---|---|---|
| 2,517,926 | 8/1950 | Ransom | 242/288 |
| 5,301,899 | 4/1994 | Sato | 188/267 |
| 5,692,693 | 12/1997 | Yamaguchi | 242/288 |

*Primary Examiner*—Katherine Matecki
*Attorney, Agent, or Firm*—Shinjyu An Intellectual Property Firm

[57] ABSTRACT

A magnetic brake mechanism 22 is disclosed which brakes the rotation of a spool 15 on a double-bearing fishing reel. The brake mechanism 22 includes a flange portion 15a on the end of spool 15, two sets of three magnets 56, and a magnet positioning means 58. The magnetic positioning means 58 variably positions the magnets 56 between a first position, in which the magnets 56 are generally parallel to the surface of the flange portion 15a, and a second position in which the magnets 56 are generally perpendicular thereto. The rotation of the flange portion 15a causes the rotation of the magnetic flux from the magnets 56 to generate an eddy current. As a result, force is applied to the flange portion 15a in the direction opposite its rotation and brakes the rotation of spool 15.

8 Claims, 6 Drawing Sheets

BRAKE MECHANISM FOR DOUBLE-BEARING FISHING REEL

BACKGROUND OF THE INVENTION

A. Field of the Invention

The present invention relates to a brake mechanism, and in particular to a brake mechanism for braking a spool on a double-bearing fishing reel.

B. Description of the Background Art

A double-bearing fishing reel typically includes a reel body having a pair of side plates and a handle, and a spool rotatably supported on the reel body between the side plates. The handle is connected to the spool via a clutch, and the spool rotates and takes up a fishing line when the handle is rotated with the clutch in the ON state. When the clutch is in OFF state, the handle is disengaged from the spool so that the spool can freely rotate, thus allowing the fishing line to be cast by the reel user.

However, when the fishing line is cast, a so-called "backlash" occurs if the speed in which the fishing line comes off the spool is slower than the rotary speed of the spool. The backlash causes the fishing line to become entangled, or to be twisted around the portion between the spool and the reel body.

To prevent the occurrence of backlash, a double-bearing fishing reel having a magnetic brake mechanism has been proposed. With a magnetic brake mechanism, a conductor is placed in the magnetic flux field and the magnetic flux is rotated by rotating the conductor, thereby generating eddy current in accordance with the frequency of rotation of the conductor. The spool is braked in proportion to the rotational speed of the spool by applying force to the conductor in a direction opposite that of the rotary direction of the conductor. This principle is commonly known as Fleming's left-hand rule.

A magnetic brake mechanism is disclosed in Japanese Utility Model Publication Kokoku No. 4-1811, and includes a plate-shaped conductor which is integrally formed with one of the flanges of the spool, a magnet spaced apart from the conductor and displaceable in the axial direction, and a cap mounted on the reel body which pivots the magnet. In this magnetic brake mechanism, the distance between the conductor and the magnet is adjusted by pivoting the cap to displace the magnet in the axial direction. Further, the density of the magnetic flux (the magnetic flux number) acting on the conductor is increased or decreased by adjusting the distance between the conductor and the magnet, thereby adjusting the braking force.

In the conventional magnetic brake mechanism described above, the adjustment of the braking force is carried out by displacing the magnet in the axial direction. The magnet therefore needs to be located quite far away from the conductor in order to sufficiently reduce the braking force by reducing the density of the magnetic flux acting on the conductor. For this reason, the displacement stroke of the magnet becomes larger and the space occupied by the brake mechanism in the double-bearing fishing reel becomes larger. This makes it difficult to sufficiently reduce the braking force in small reels.

SUMMARY OF THE INVENTION

One object of the invention is to provide a magnetic brake mechanism that effects a satisfactory reduction in the braking force in small fishing reels.

In accordance with a first aspect of the present invention, a brake mechanism for a double-bearing fishing reel includes a reel body, a spool rotatably mounted on the reel body, an electric conductor rotatable with the spool, at least one magnet, and at least one magnet positioning means. The magnet positioning means is capable of variably positioning the magnet between a first position in which a surface of the magnet is generally parallel to a surface of the electric conductor, and a second position in which the surface of the magnet is generally perpendicular to the surface of the electric conductor.

In this brake mechanism, the rotating spool also rotates the magnetic flux from the magnet to generate eddy current. Consequently, force is applied to the electric conductor in the opposite direction of its direction of rotation and brakes the spool. When the magnet is pivoted the second position by the magnet positioning means, the density of the magnetic flux acting on the electric conductor is reduced.

In accordance with a second aspect of the present invention, the electric conductor is non-magnetic. In this case, since magnetic force is not generated in the space between the magnet and the electric conductor, the force needed to rotate the spool is not applied to the spool.

In accordance with the third aspect of the present invention, the magnet positioning means includes a pivotable member which retains the magnet. The pivotable member is supported on the reel body and pivotable about a shaft whose axis is generally perpendicular to a rotational axis of the electric conductor. The magnet positioning means also includes a moving member for moving the pivotable member between the first position and the second position.

In this case, the magnetic flux acts generally perpendicular to the electric conductor when the magnet is in the first position. As the magnet is pivoted to the second position, the magnetic flux acting on the electric conductor gradually becomes oblique with respect to it. As a result, the magnetic flux density is rapidly reduced. When the magnetic flux is generally parallel to the electric conductor, the magnetic flux barely acts on the electric conductor, thereby reducing the braking force. Because the magnet is pivoted in this manner, the braking force can be efficiently reduced within a small space.

In accordance with a fourth aspect of the present invention, the moving member comprises a cam member formed with a cam groove on its circumference and rotates about the rotational axis of the electric conductor. The pivotable member includes a cam protrusion which engages with the cam groove, and the pivotable member pivots in response to movement of the cam member.

In this case, when the moving member is pivoted about the rotary shaft of the electric conductor, the pivotable member is pivoted in a direction generally perpendicular to the axis rotary shaft due to the engagement between the cam groove and the cam protrusion. As a result, rotary movement can be efficiently converted to pivotal movement by means of the cam mechanism.

In accordance with a fifth aspect of the present invention the magnet positioning means further comprises an urging member for urging said pivotable member toward the second position.

In this case, since the pivotable member is urged toward the second position by the urging member, any imperfection during pivoting of the pivotable member by the moving member can be suppressed. As a result, the attitude of the pivotable member and the braking are kept constant.

In accordance with a sixth aspect of the present invention, two magnet positioning means are disposed on opposing sides of the rotational axis of the electric conductor, thereby increasing the braking force.

In accordance with a seventh aspect of the present invention, the spool is an electric conductor, which reduces the number of components and assembly steps.

In accordance with an eighth aspect of the present invention, the electric conductor is coaxially mounted on an end surface of the spool. This allows a spool made of synthetic resin to be employed, thus reducing the overall weight.

The foregoing and other objects, features, aspects and advantages of the present invention will become more apparent from the following detailed description, when taken in conjunction with the accompanying drawings.

DESCRIPTION OF THE PREFERRED EMBODIMENTS

Figure 1:
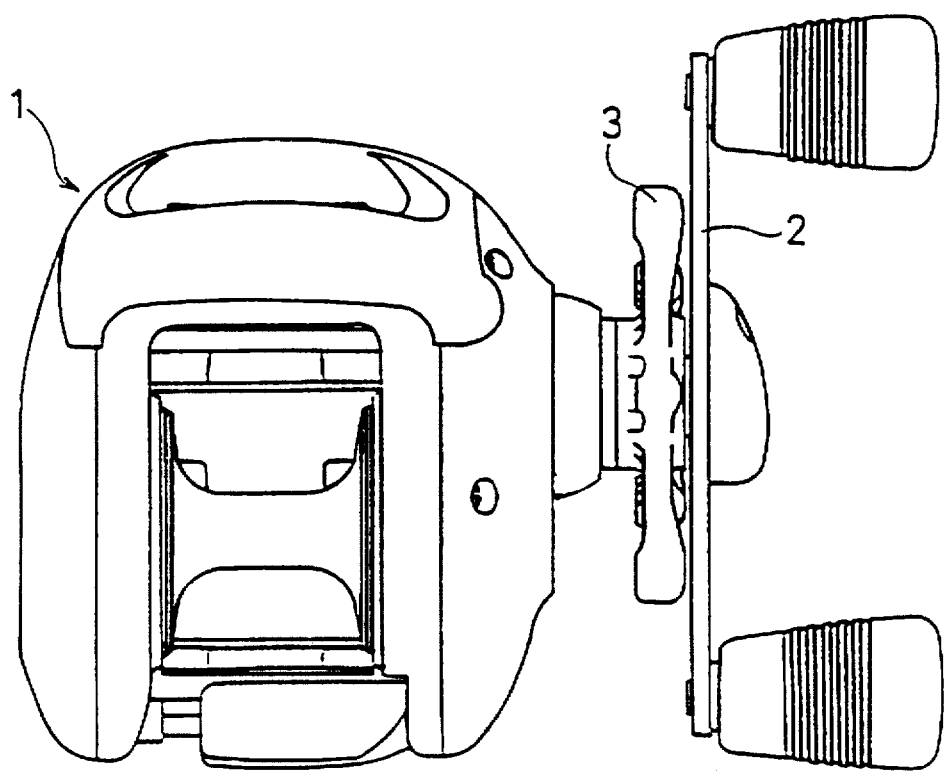
FIG. 1 is an elevational view of a double-bearing fishing reel employing one embodiment of the present invention.

FIG. 1 is an elevational view of a double-bearing fishing reel employing one embodiment of the present invention. The double-bearing fishing reel shown includes a reel body 1, a handle 2 for rotating a spool, and a star drag 3 for adjusting the amount of drag on a fishing line.

Figure 2:
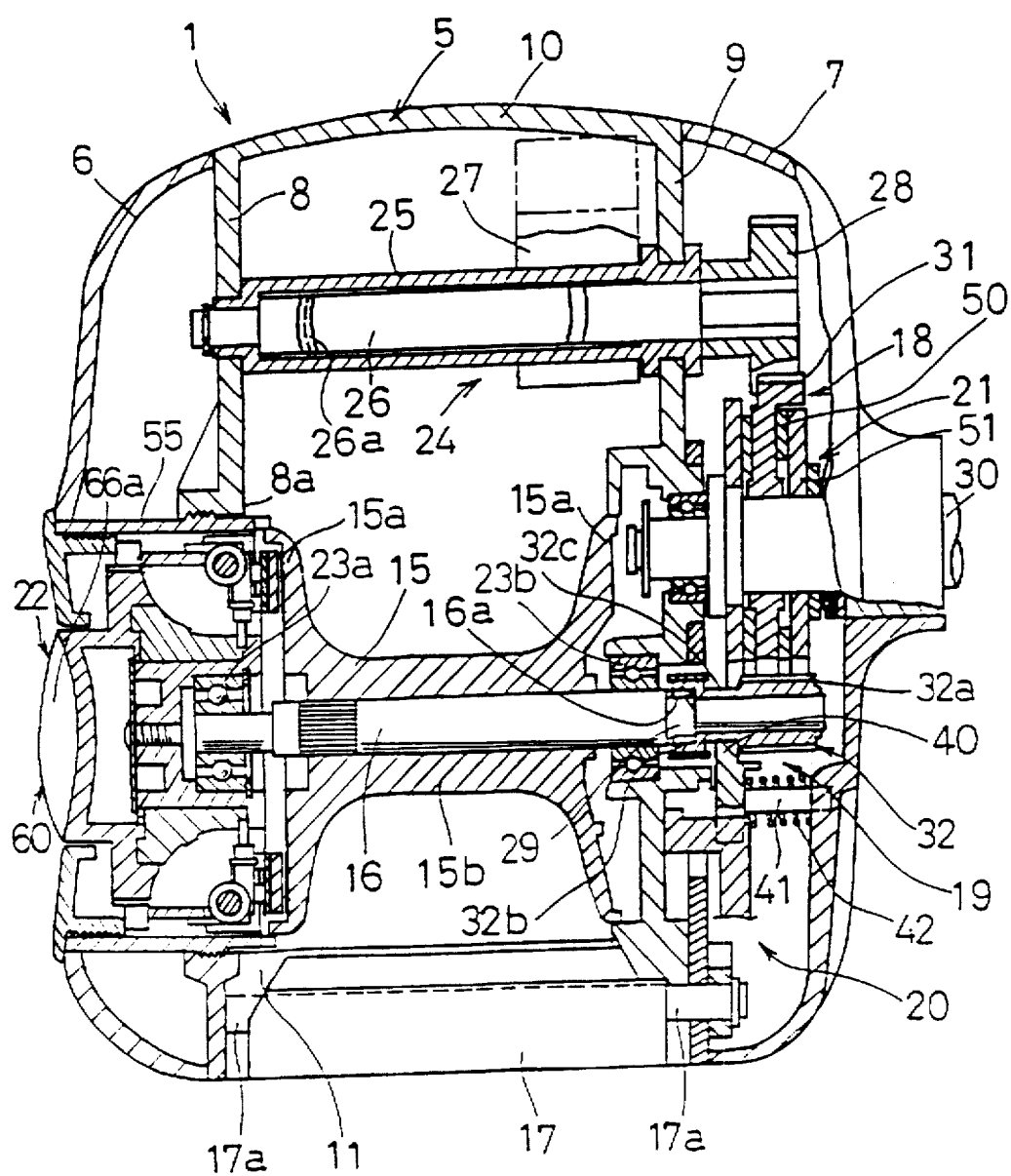
FIG. 2 is a cross sectional view of the double-bearing fishing reel depicted in FIG. 1, showing a magnetic brake mechanism 22.

As shown in FIG. 2, the reel body 1 includes a frame 5, and a first cover 6 and a second cover 7 which are fitted to the opposing sides of the frame 5. The frame 5 includes a pair of side plates 8 and 9, and a front coupling portion 10 and a rear coupling portion 11 which connect the side plate 8 to the side plate 9.

A spool 15 around which fishing line is wound, a level-wind mechanism 24 for uniformly winding the fishing line around the spool 15, and a thumb-rest 17 are disposed on the frame 5. Disposed between the frame 5 and the second cover 7 is a gear mechanism 18 for transmitting rotary force from the handle 2 to the spool 15 and the level-wind mechanism 24, a clutch-engage/disengage mechanism 19 for engaging or disengaging the clutch, a selective engagement control mechanism 20 for controlling the engagement or disengagement of the clutch in accordance with the operation of the thumb-rest 17, and a drag mechanism 21. Disposed between the frame 5 and the first cover 6 is a magnetic brake mechanism 22 for adjusting the braking force on the rotation of the spool 15, and suppressing the occurrence of backlash when the fishing line is cast.

The spool 15 is composed of a non-magnetic electric conductor such as aluminum, and includes flange portions 15a on its ends and a spool body 15b disposed between the flange portions 15a. The spool 15 is fixed to a spool shaft 16 which passes through the center portion thereof. The spool shaft 16 is rotatably supported on the frame 5 by bearings 23a, 23b and a brake case 55 fixed to the side plate 8 of the frame 5.

The level-wind mechanism 24 includes a guide tube 25 fixed between the pair of side plates 8, 9, a worm shaft 26 rotatably supported within the guide tube 25 and a line guide 27. A gear 28 is fixed to an end portion of the worm shaft 26. The worm shaft 26 is formed with a screw-shaped groove 26a which is mated with a portion of the line guide 27. With this arrangement, the line guide 27 reciprocates along the guide tube 25 upon the rotation of the worm shaft 26 via the gear mechanism 18.

The thumb-rest 17 is disposed between the pair of the side plates 8, 9 and the rear of the spool 15 (the lower side in FIG. 2). A rotary shaft 17a on the thumb-rest 17 is rotatably supported in a groove formed in the side plate 9. The thumb-rest 17 can slide up and down along the groove, and the front face of the thumb-rest 17 is in contact with the rear coupling portion 11, thereby limiting the displacement of the thumb-rest 17.

The gear mechanism 18 further includes a master gear 31 fixed to a handle shaft 30, a pinion gear 32 mated with the master gear 31, and the gear 28 fixed to the end portion of the worm shaft 26 described above.

The pinion gear 32 includes a gear tooth portion 32a formed on one end of its outer periphery, an interlocking portion 32b formed on the other end of its outer periphery, and a reduced diameter portion 32c formed between the gear tooth portion 32a and the interlocking potion 32c. A central portion of the interlocking portion 32b is formed with an engaging groove which is engagable and disengageable with an engaging convex portion 16a formed on the spool shaft 16. The interlocking portion 32b and the engaging convex portion 16a constitute a clutch 29. When the pinion 32 gear moves outward, the engaging groove on the interlocking portion 32b is disengaged from the engaging convex portion 16a on the spool shaft 16. As a result, the clutch 29 turns OFF and the rotary force from the handle shaft 30 is not transmitted to the spool 16.

The clutch engage/disengage mechanism 19 includes a clutch yoke 40. The clutch yoke 40 is disposed on the outer circumferential side of the spool shaft 16 and is supported by two pins 41 so as to be movable generally parallel with the axis of the spool shaft 16. The clutch yoke 40 turns the clutch 29 ON and OFF by engaging with the reduced diameter portion 32c of the pinion gear 32 and moving the pinion gear 32 along the axis of the spool shaft 16. The clutch yoke 40 is normally urged inward (toward the frame 5 side) by springs 42 disposed around the pins 41.

The selective engagement control mechanism 20 controls the clutch yoke 40 according to the movement of the thumb-rest 17 such that the clutch 29 is automatically turned ON upon the rotation of the handle shaft 30.

The drag mechanism 21, as shown in FIG. 2, includes a friction plate 50 pressed into contact with the master gear 31, and a pressing plate 51 for pressing the friction plate 50 against the master gear 31 with a predetermined amount of force by means of the rotation of the star drag 3.

Figure 3:
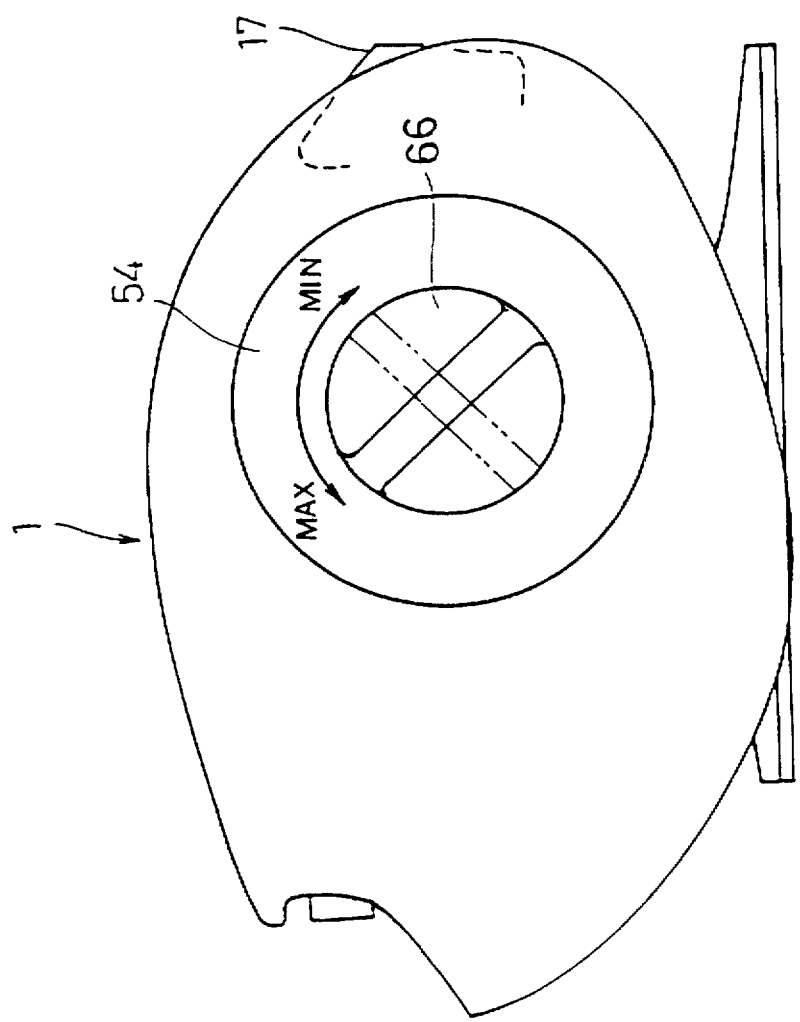
FIG. 3 is a right side view of the double-bearing fishing reel depicted in FIG. 1.
Figure 4:
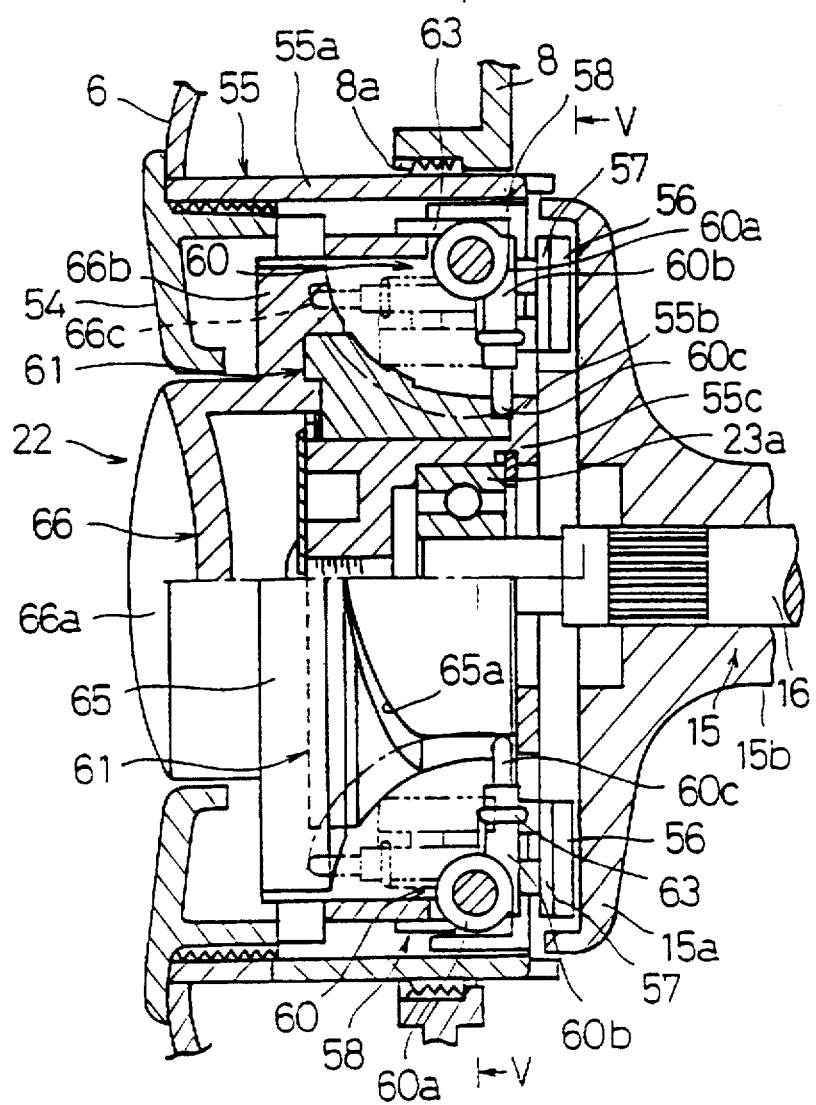
FIG. 4 is a cross sectional view showing a more detailed view of the magnetic brake mechanism 22 depicted in FIG. 2.
Figure 5:
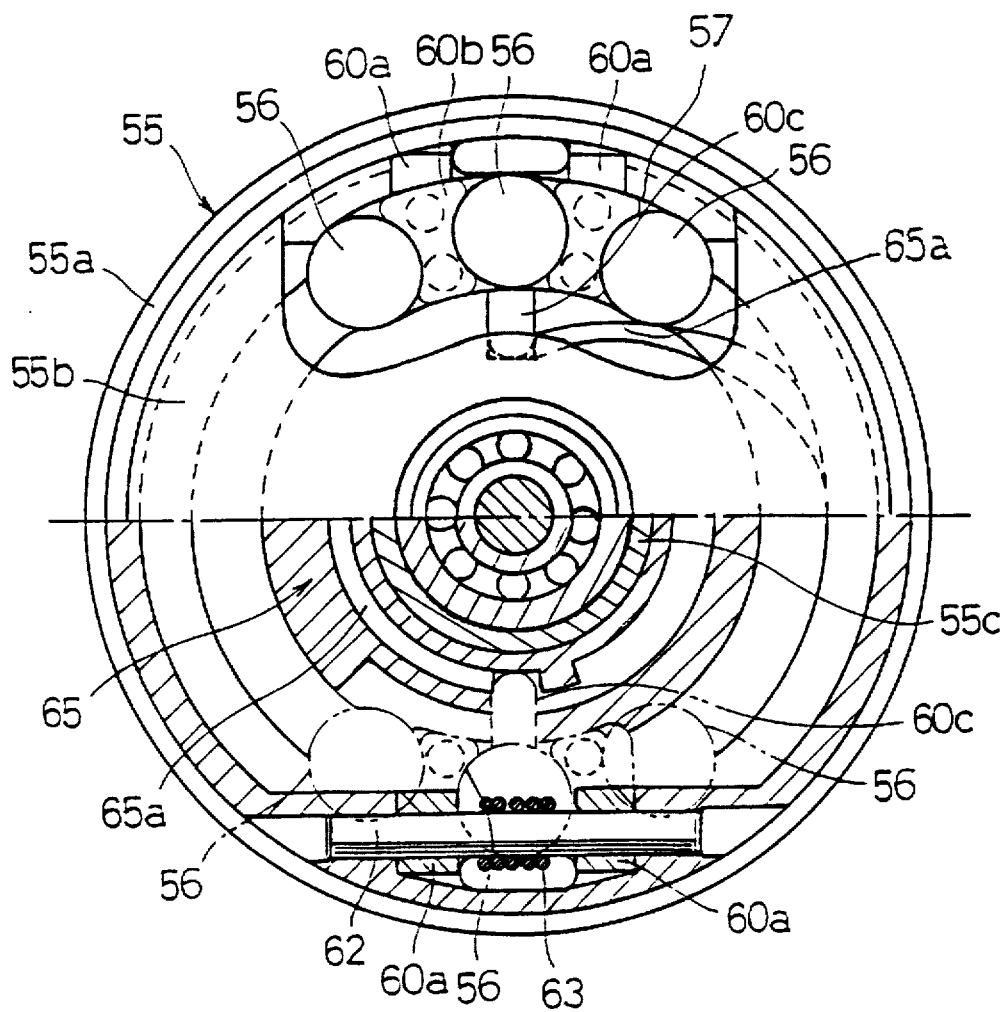
FIG. 5 is a cross sectional view of the brake mechanism 22 taken along the line V—V in FIG. 4.

The brake mechanism 22, as shown in FIGS. 3, 4 and 5, is disposed within the brake case 55. The brake case 55 includes a threaded portion around its outer diameter, and is connected to the side plate 8 through a threaded hole 8a. The opening of the brake case 55 is covered with a disc-like brake cover 54. The brake case 55 includes a cylinder portion 55a, a wall portion 55b formed on the spool side of the cylinder portion 55a, and a boss portion 55c formed in the central portion of the wall portion 55b. The bearing 23a is disposed within the boss portion 55c and supports one end of the spool shaft 16.

In the brake mechanism 22, a conductor is placed in a magnetic flux field and the magnetic flux is then rotated by rotating the conductor, thereby generating eddy current in accordance with the frequency of rotation. This action brakes the spool 15 in proportion to its rotational speed by applying force to the conductor in a direction opposite to the rotational direction of the conductor, according to Fleming's left-hand rule.

The brake mechanism 22 includes a flange portion 15a formed from a non-magnetic electric conductor, two sets of three magnets 56, and a magnet positioning means 58. The magnet positioning means 58 serves to variably position the magnets 56 between a first position, in which the faces of the magnets 56 are generally parallel to the surface of the flange portion 15a, and a second position in which the faces of the magnets 56 are pivoted to a generally perpendicular position with respect to the surface of the flange portion 15a.

Each of the magnets 56 are disk-shaped and are connected to one another at their rear surfaces via a yoke 57. The two sets of magnets 56 are each disposed at opposing positions with respect to the spool shaft 16. Two magnet positioning means 58 are disposed at opposing positions with respect the spool shaft 16, and include a retaining portion 60 for retaining the magnets 56 and a pivot drive portion 61 for pivoting the retaining portions 60, respectively.

The retaining portion 60 is supported by the cylinder portion 55a, and pivots generally perpendicular to the axis of the spool shaft 16. The retaining portion 60 is variably pivotable between the first position (shown in FIG. 6(a)), in which the faces of the magnets 56 are generally parallel to the flange portion 15a, and the second position (shown in FIG. 6(b)), in which the faces of the magnets 56 are generally perpendicular to the surface of flange portion 15a.

More specifically, the retaining portion 60 is supported on the cylinder portion 55a by a pair of pivot shafts 62. The axes of the pivot shafts 62 are disposed to be generally perpendicular to the axis of the spool shaft 16. The retaining portion 60 includes a pair of support portions 60a spaced apart from each other in the axial direction on each pivot shaft 62 and supported by each pivot shaft 62, a magnet retaining portion 60b which extends from the support portion 60a toward the spool 15 and which retains the magnets 56 in a equidistant circumferential direction, and a cam protrusion 60c which extends from the portion between the support portions 60a toward the center of the brake case 55 so as to be engaged with a cam groove 65 (described below). In the portion between the support portions 60a, a torsional coil spring 63 is disposed around the pivot shaft 62 and urges the retaining portion 60 toward the position shown in FIG. 6(b). One end of the torsional coil spring 63 is engaged with the brake case 55 and the other end thereof is engaged with the magnet retaining portion 60b.

The pivot drive portion 61 includes a grooved cam 65 pivotably supported on the boss portion 55c of the brake case 55, and an operation knob 66 fixed to the grooved cam 65. The grooved cam 65 has curved, generally trapezoidal outer peripheral surface, and includes two curved cam grooves 65a on its outer circumferential surface. Each cam groove 65a is engaged with the cam protrusion 60c of each retaining portion 60.

The operation knob 66 includes an ear portion 66a which extends outward from the central hole of the brake cover 54, and a cam portion 66b having a diameter larger than that of the ear portion 66a and an outer circumferential surface integral with that of the grooved cam 65. The ear portion 66a is used for turning the operation knob 66 by hand. The cam portion 66b is formed with an curved cam groove 66c coplanar with the cam groove 65a. The cam mechanism can effect an efficient conversion from rotational movement to pivotal movement about the shaft 62. Specifically, rotational movement about the spool shaft 16 by means of the operation knob 66 can be converted to pivotal movement of the retaining portion 60 about the shaft 62 by engaging the cam protrusion 60c with the cam grooves 65a and 66c.

The operation of this embodiment will now be described.

The clutch 29 is normally in the engaged (ON) state and the rotary force from the handle is transmitted to the spool shaft 16 and the spool 15 via the handle shaft 30, master gear 31, and the pinion gear 32. At this time, the operation knob 66 of the brake mechanism 22 is positioned as shown with the dashed line in FIG. 3. In this state, the retaining portion 60 is in the position shown in FIG. 6(b). Therefore, the magnetic flux from the magnets 56 has little effect on the flange portion 15a, and thus there is little braking force applied to the spool 15. As a result, the brake mechanism 22 does not brake the spool 15 when the fishing line is reeled in, thus allowing the fishing line to be taken up with a small amount of force.

When the fishing line is to be cast, the thumb-rest 17 is pushed downward. In this state, the interlocking portion 32b of the pinion gear 32 is disengaged from the engaging convex 16a of the spool shaft 16, and the clutch is disengaged (OFF). When the clutch is in OFF state, the rotational force from the handle shaft 30 is not transmitted to the spool shaft 16, and the fishing line can freely roll off of the spool 15. At this time, the position of the magnets 56 can be adjusted by turning the operation knob 66 of the brake mechanism 22 about the spool shaft 16. Consequently, the braking force upon the rotation of the spool 15 can be adjusted to prevent the occurrence of backlash.

Figure 6A:
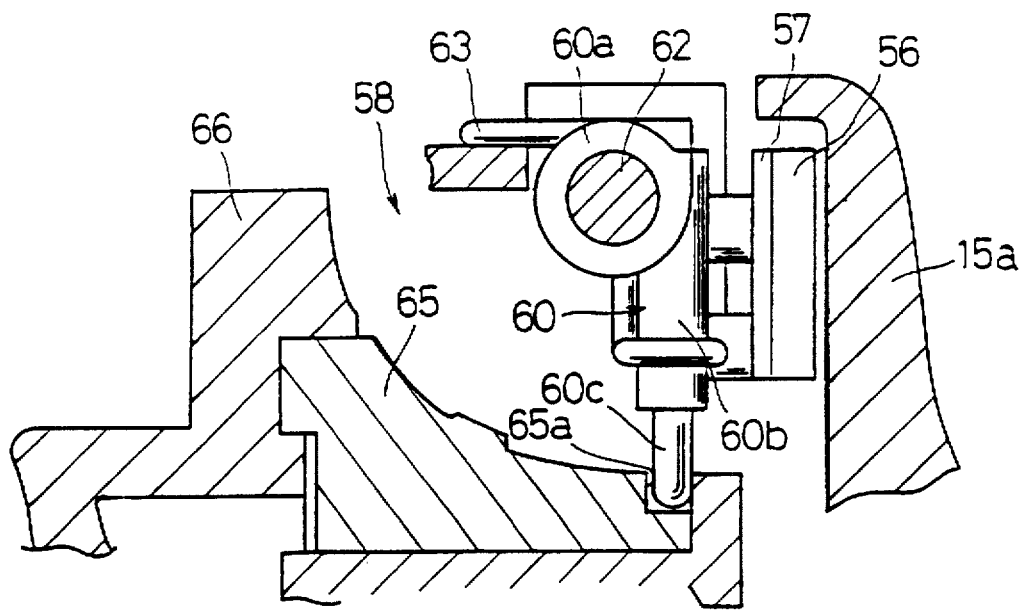
FIG. 6(a) is a schematic view showing the relationship between a magnet 56 and a flange portion 15a in a first position.
Figure 6B:
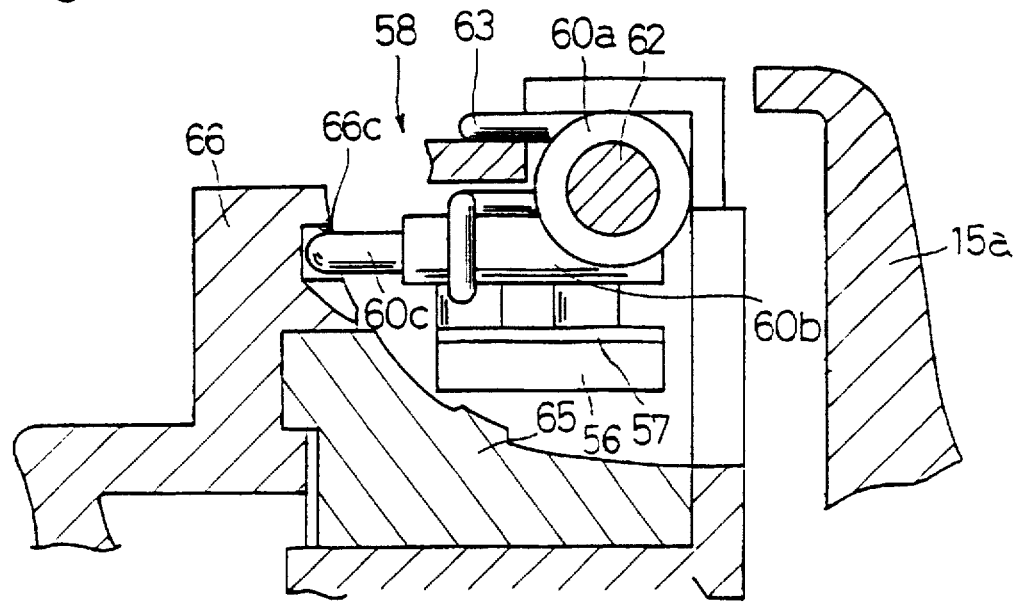
FIG. 6(b) is a schematic view showing the relationship between a magnet 56 and a flange portion 15a in a second position.

In FIG. 3, when the operation knob 66 is turned from the position shown with the dashed line to the position shown with the solid line, the cam protrusions 60c are guided along the cam grooves 66c and 65a, and the retaining portion 60 is pivoted to the position shown in FIG. 6(a). However, it should be understood that the magnets 56 can be positioned in a plurality of intermediate positions between those shown in FIGS. 6(a) and 6(b).

The density of the magnetic flux acting on the flange portion 15a from the magnets increases as the magnets 56 approach the position shown in FIG. 6(a). That is, as the magnetic flux acting on the flange portion 15a gradually becomes perpendicular to the flange portion 15a, the number of magnetic fluxes increases while the distance between the magnetic fluxes becomes narrower, thus increasing the density. When each retaining portion 60 is pivoted so that the faces of the magnets 56 are generally parallel to the flange portion 15a, the magnetic flux is generally perpendicular to the flange portion 15a. Consequently, the maximum amount of magnetic flux acts on the flange portion 15a, and the magnetic flux density of the flange portion 15a reaches a maximum. The rotation of the spool 15 then causes the magnetic flux to rotate, thereby generating eddy current in accordance with the frequency of rotation and the magnetic flux density. The force applied in the opposite direction of the direction of rotation (i.e., the braking force) acts on the flange portion 15a due to the eddy current.

In this embodiment, adjustment of the braking force is carried out by pivoting the magnets 56 about the shaft 62, thereby effecting a satisfactory adjustment of braking force within a small space. In addition, since the retaining portion 60 is urged toward the generally perpendicular position by the torsional coil spring 63, any unsteadiness in the retaining portion 60 due to imperfections in the portion between the cam protrusion 60c and the cam grooves 66c, 65a can be suppressed, and the amount of braking which corresponds to the position of the operation knob 66 can be kept constant.

The present invention can be modified in a number of ways. For example, although the spool shaft is not directly braked in the embodiment mentioned above, a conventional mechanical brake mechanism in which the spool shaft 16 is directly interposed may be juxtaposed to it. In addition, the ear portion 66a may be in the form of lever.

Further, when a spool made of synthetic resin is used, an electric conductor (such as an aluminum plate) may be provided on the end surface of the spool. Alternatively, the brake mechanism with an electric conductor and magnets may be mounted on a mechanism which is driven in association with the spool and connected to it via, for example, a gear, instead of coaxially mounting it on the end surface of the spool.

A magnetic member such as an iron plate may also be used as an electric conductor. In this case, since the magnetic force of the member can also be utilized for braking, the braking force is increased when compared to a non-magnetic member such as an aluminum plate.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. A brake mechanism for a double-bearing fishing reel comprising:

a reel body;

a spool rotatably mounted on said reel body;

an electric conductor rotatable with said spool;

at least one magnet; and at least one magnet positioning means, said magnet positioning means capable of variably positioning said magnet between a first position in which a surface of said magnet is generally parallel to a surface of said electric conductor, and a second position in which said surface of said magnet is generally perpendicular to said surface of said electric conductor.

2. The brake mechanism as set forth in claim 1, wherein said electric conductor is non-magnetic.

3. The brake mechanism as set forth in claim 1, wherein said magnet positioning means comprises a pivotable member which retains said magnet, said pivotable member supported on said reel body and pivotable about a shaft whose axis is generally perpendicular to a rotational axis of said electric conductor, and a moving member for moving said pivotable member between said first position and said second position.

4. The brake mechanism as set forth in claim 3, wherein said moving member comprises a cam member formed with a cam groove on its circumference and rotates about said rotational axis of said electric conductor, and said pivotable member includes a cam protrusion which engages with said cam groove, and said pivotable member pivots in response to movement of said cam member.

5. The brake mechanism as set forth in claim 1, wherein said magnet positioning means further comprises an urging member for urging said pivotable member toward said second position.

6. The brake mechanism as set forth in claim 1, further comprising two magnet positioning means disposed on opposing sides of said rotational axis of said electric conductor.

7. The brake mechanism as set forth in claim 1, wherein said spool is an electric conductor.

8. The brake mechanism as set forth in claim 1, wherein said electric conductor is coaxially mounted on an end surface of said spool.

* * * * *